Patented July 30, 1935

2,009,986

UNITED STATES PATENT OFFICE 2,009,986

RESINOUS SUBSTANCE

Carleton Ellis, Montclair, N. J., assignor to Ellis-Foster Company, a corporation of New Jersey No Drawing. Application January 10, 1929,
Serial No. 331,727

17 Claims. (Cl. 260—3)

This invention relates to resinous materials of the type of resinated ureas and substituted ureas, including sulphur-containing bodies such as the thio resins, as will be more fully hereinafter set forth. The instant application is a continuation in part of prior applications, Serial Nos. 689,165, 735,600, and 28,505.

In application, Serial No. 689,165, filed January 28, 1924, entitled "White synthetic resin and process of making same", there is described and claimed acid catalyzed urea-aldehyde type resins and methods of making the same generically covering such urea-aldehyde type condensation products. In application, Serial No. 735,600, filed September 3, 1924, entitled "Urea products and process of making same", there are described and claimed urea-thiourea-formaldehyde condensation products and methods of making the same, and mica products utilizing such urea resins and urea-aldehyde resins generally as cementing agents. In application, Serial No. 28,505, filed May 6, 1925, entitled "Synthetic resin and process of making same", there are described and claimed the heat and pressure treated urea-aldehyde reaction products, this application now being Patent No. 1,846,853. In application, Serial No. 323,215, filed December 1, 1928, entitled "Resinous condensation products" now Patent No. 1,897,978, there are described and claimed resinous composites produced from urea and related compounds with thiourea and/or resinifying sulphur-containing compounds produced under heat and pressure, and acid condensation products of the stated derivatives, as well as methods of making same.

The invention is particularly concerned with resinous products obtained by condensation of urea or substituted ureas with aldehydes such as formaldehyde, such products also containing thio derivatives and particularly resinous sulphur containing products. Various examples of products coming within the scope of the invention are given below.

As an example a resinous product may be obtained, in the making of which dimethylol urea is incorporated with phenol sulphur resins, prepared, for example, by reacting on phenol with sulphur chloride. Thus, one part by weight of phenol is treated with two to two and one-quarter parts of sulphur monochloride to yield a resin. This resin may be incorporated with 10% and upwards of dimethylol urea.

As a further example one may employ thiourea formaldehyde resin preferably in conjunction with urea formaldehyde resin. The resinated thiourea with the resinated urea thus provides a sulphur-containing resinous product. There is given below a method of making such products.

A urea-formaldehyde resin may be made as follows, 30 parts by weight of urea are dissolved in 120 parts of aqueous 40 per cent formaldehyde and 3 parts of phthalic acid or phthalic anhydride are added. As the urea dissolves in the formaldehyde solution there is a decided lowering of temperature. Then the solution begins to show signs of turbidity which change is accomplished by a gradual rise in temperature. The reaction is exothermic. The solution finally becomes milky about the time the spontaneous temperature rise has reached its maximum. In one case the temperature went from 28 to 67° C. in about 20 minutes. The reaction mixture was allowed to stand for 1 hour during which time the temperature dropped to 42° C. Heat was applied and the temperature was raised over a period of one-half hour to 76° C. and then more gradually over a period of 2 hours to 94° C. After heating for about 45 minutes the mixture began to clear but a longer heating was required to completely clarify the solution. A syrupy solution was obtained having a specific gravity of 1.151 at 25° C., the solid content of which was 44 per cent.

The syrup may be diluted with water to contain 5.5 per cent of the urea resin and used as a cementing agent.

In order to make a product which can be readily diluted with water it is best to carry out the reaction (according to the above formula) under a reflux condenser. A syrup is thus obtained which can be diluted with two or three times its volume of water without turbidity and beyond this dilution a small amount of alcohol will prevent turbidity. If, however, the reaction is carried out in an open vessel the addition of water in say equal volume may cause a heavy turbidity.

The foregoing binder is preferably prepared from mixtures of urea and thiourea by subjecting these substances to appropriate treatment with formaldehyde, in the manner set forth whereby urea-thiourea-formaldehyde condensation products are obtained.

In place of formaldehyde, paraform and other polymers of formaldehyde may be employed and in some cases hexamethylene-tetramine by itself or in conjunction with formaldehyde. Furthermore, the invention does not preclude the use of other aldehydes capable of yielding with urea substances having an adhesive or cementing property. The reaction products of urea and/or thiourea and other reactive sulphur resins, with acrolein, furfural, butyl aldehyde, acetaldehyde and so forth; using the aldehydes singly or in admixture, with or without formaldehyde; all to such extent as may be appropriate for the particular requirement in hand, will provide a series of condensation products of varying strength and binding power, etc., or of suitable solubility for employment in varnishes, lacquers, with nitrocellulose as resinous material or as plasticizers to form coating compositions and the like.

Preferably I employ an acid catalyst such as phthalic acid or other organic acid such as benzoic salicylic, chloracetic, oxalic acids and the like. It is also possible to use catalytic proportions of mineral acids such as hydrochloric acid in some cases.

In other cases an alkaline catalyst such as ammonia or caustic soda may be employed. Sometimes it is feasible in preparing the syrup to start the reaction with a small amount of an alkaline catalyst and then acidulate with an acid catalyst such as phthalic acid.

The invention however contemplates the use of the resin whether made in acid, alkaline or neutral solution. It also may include urea phenol formaldehyde resin prepared for example by reacting on urea and phenol with formaldehyde in the presence of phthalic acid or other catalyst.

While the sulphur-containing resinous product of urea and thiourea may be prepared by the simultaneous action of formaldehyde (or other aldehyde) on the urea and thiourea, the phenol sulphur resin is best prepared separately and incorporated with the resinated urea by means of a solvent vehicle, mixing rolls or in any other suitable manner. The sulphur resin may be present, as mentioned above, in proportions of 10 per cent and upwards. Ordinarily equal parts of resinated urea and phenol sulphur resin may be used. The employment of cresol sulphur resin, xylenol sulphur resin and the like is not precluded.

Other derivatives of urea which may be used in the preparation of the resinous product or composite of the present invention are, for example, guanidine and various reactive resinifying guanidine bodies, or substituted guanidines, thiocarbanilide, substituted thioureas, and so forth.

In most cases I prefer to have present a substantial proportion of the sulphur (thio) resin sufficient to provide a readily-fusible material capable of flowing freely under heat and pressure, to yield a sharp imprint of the mold, when employed for making shaped articles. If the resinous complex or composite has two components such as resinated urea and resinated thiourea a range of recommended proportions is 1:3 to 3:1. If the complex or composite comprises (a) resinated urea (or resinated guanidine or other non-sulphur resinated urea derivatives) (b) resinated thiourea (or resinated thiocarbanilide and the like) and (c) phenol sulphur resin (cresol, xylenol, naphthol sulphur resin) the proportions may be (A) 2:1:1, (B) 1:1:2, (C) 1:2:1 or otherwise varied according to the requirements in hand.

Some of the sulphur resins such as those made from phenol and sulphur chloride, especially if not quite free of solvent, may exhibit a tendency to blacken steel molds when employed in plastic molding compositions. Apart from the possibility of using chrome steel or other resistant alloy steel molds, there exists a method described in Patent 1,564,002 of incorporating a small proportion of phosphoric acid with the phenol sulphur resin. The present invention does not preclude the possibility of using phosphoric acid to accelerate the resinification of urea and formaldehyde with subsequent incorporation of one of the phenol sulphur resins, thus to avail of the protective effect of the phosphoric acid with respect to the sulphur resin, and giving to the acid the joint role of catalyst and protecting agent.

The foregoing matter suffices to illustrate the resinous complex or composite of the present invention comprising the aldehyde reaction products of urea and a sulphur-containing compound; specifically the formaldehyde reaction products of urea and thiourea; urea and phenol sulphur resin; urea, thiourea and phenol sulphur resin. If the latter is not prepared with too high a proportion of sulphur chloride, it tends to be reactive with formaldehyde, hexamethylene tetramine, acetals and other methylene-yielding bodies. Hence there is at hand the means of inter-resinification of urea material and one or more thio bodies such as thio resins. When the initial resinous bodies are separately prepared, mixed and then hot pressed, the reactions taking place in the mold are conducive to inter-resinification and to the derivation of properties not possessed by either resin individually and not necessarily their mean or average, collectively considered.

The invention thus additionally comprehends the inter-resinified sulphur-containing products of heat and pressure of the ureas (or active derivatives or substituted compounds thereof) with a reactive methylene body; one such resinous complex or composite being the formaldehyde reaction products of urea and thiourea. These products are particularly useful in producing molded articles.

As indicated, the methylol ureas provide a convenient reactive material which may be admixed with another urea compound such as thiourea, methylol thiourea, or with a phenol sulphur resin.

In another case using a wood flour filler, pressing was conducted at 110° C. for 10 minutes at a pressure of 3,000 lbs. yielding a light yellow, translucent, hard, tough molded article. A temperature of 110° C. is a relatively low one for molding purposes and was used in the present case in order to give as fovorable results as possible in regard to light color. The temperature of molding may however be increased with subsequent increase in speed of setting or curing in the mold to produce an infusible article which may be taken from the mold without necessity of cooling. A second resin, more fusible and not setting as rapidly as dimethylol urea, is desirably present. The slower setting or non-setting sulphur-containing resins mentioned are especially appropriate.

The following, from Serial No. 689,165 indicates some of the properties of dimethylol urea and its especial utility in making molded products.

When dimethylol urea is heated it melts somewhere in the neighborhood of 120° C. but on further heating, for example, 20 or 30 degrees higher, reaction takes place and a substance is formed which is quite infusible at the temperature at which it is produced and may be heated to a considerably higher temperature before softening or carbonization occurs. For example it may be heated nearly 100 degrees above its hardening point before it begins to show signs of decomposition. This property of heat-setting or becoming thermo-rigid makes possible the use of the material in or as a basis of molding compounds which under heat and pressure become solidified or consolidated to a shaped mass. Molded articles may be obtained which are firm, strong and more or less heat resistant.

In the molding field there is desired not necessarily a perfectly infusible resin or binder but one which on solidifying at the molding temperature is sufficiently firm at that temperature to be removed from the molding press while still hot and be handled and exposed without deformation or loss of surface lustre. The labor cost in molding is so great that the few minutes time required to cool the mold in the production of platics from fusible resins which do not harden or become thermo-rigid represents a considerable item in the total cost of manufacture. Hence the desirability of a resin not necessarily becoming infusible but which will sufficiently harden in the mold at the molding temperature.

Dimethylol urea is suitable for this purpose on account of its hardening property, the differential or spread in temperature between the melting point and the point at which it decomposes under strong heating is sufficiently great that even though not wholly infusible it is capable of meeting the demand for a labor-saving molding compound of this general character.

It is not necessary to employ pure dimethylol urea, for the crude substance, contaminated with various other bodies, may be used in many cases. It is however desirable to heat the crude dimethylol urea for a period to thoroughly dry it and remove as far as possible any substances which might evolve gases in the mold. Thus dimethylol urea was baked 18 hours at 120° C. A white product was obtained which was placed in a mold in powdered form and molded at 300° F. (149° C.) under a pressure of 1000 pounds and higher. A white solid article was obtained which had a glossy surface and which when placed in a Bunsen flame did not melt but burned slowly with carbonization.

It is thus noted that the temperature of molding preferably should be regulated and confined to a rather restricted range. In one case, with asbestos fibre filler, a molding powder containing the resinated urea was pressed for 10 minutes in a hydraulic press at approximately 110° C.

From the foregoing, it will be evident that I prefer to conduct the molding step at pressures between 1000 and 3000 lbs. and at a temperature preferably ranging from 110° C. to 145° or 150° C. to make fabricated products from resinated ureas.

Thus a molding composition was made from urea and thiourea in the following manner:

Thiourea 20 parts, urea 10 parts, formalin 170 parts, phthalic anhydride 3 parts, all by weight, were mixed. 53 parts of water was added and the mixture was heated slowly to 90° C. and finally evaporated to dryness at approximately the same temperature. The formalin used in the foregoing was somewhat under the usual forty per cent strength, hence was used in larger proportion than set forth in the previous example. The product was a white solid, which was subsequently powdered. This molding composition was placed in a steel mold and was pressed at a temperature of 128° C., pressure two thousand pounds, for a period of ten minutes. A translucent molded article resulted. It had a hard horny structure. The molded article had an excellent "fin" showing good flowing and molding property. Filler was not used in this molding composition.

It is within the scope of the present invention to provide molding compositions which on heat-pressing yield transparent to translucent-shaped products. Such pressure-made articles exhibit the highest degree of transparency and translucency when fillers are omitted. On the other hand if fillers such as mica flake, shredded cellophane and glassine pulp are employed light colored translucent effects may be secured.

Gelatine and casein, both reactive with formaldehyde and other methylene-bearing compounds, may be incorporated in such compositions, as is stated in certain of the foregoing patent applications cited. In some cases they may perform the useful function of absorbing any excess of formaldehyde liberated through exposure to pressure at elevated temperatures and thus may assist in the attainment of a higher degree of translucency as well as tending to prevent blistering in some cases.

By molding at a temperature not exceeding 150° C. and preferably not above 145° C. I am able to produce white or light colored products somewhat resembling ivory without danger of decomposition causing discoloration. The process of molding the foregoing compositions therefore preferably comprises pressing at a molding temperature approximately between 110° C. and 150° C.; the molding powder or composition comprising urea resin and a sulphur-containing resin, preferably for a period not to exceed ten minutes. On the other hand reduction of the molding temperature to below 110° C. or 120° C. tends to render the molding operation too protracted. In general I prefer a molding time of from five to ten minutes for articles of medium thickness, while thinner moldings may be made in a shorter period.

Translucent effects may be obtained when employing ground wood or wood flour as a filler but the color is yellow or brown which in some cases is undesirable. Wood flour, however, may be employed as a filler with or without mica powder, glassine pulp and the like. The proportion of filler to resin may vary depending on the character of the surface desired and the use to which the article is to be put. In general a somewhat larger proportion of resin than filler is desirable for effective translucency.

The binders and resins of the present invention may be employed with various fillers and extending agents as for example, mineral fillers e. g. gypsum, whiting, mica, infusorial earth, clay and asbestos, or organic fillers such as cotton flock, wood pulp, sawdust, wood flour, cork, leather scrap, etc. Most of the fillers employed in the plastic molding industry at the present time are suitable without specific enumeration. With the binders and resins of the present invention, there may also be included other synthetic resins or natural resins, gums, asphalt, coloring matter, rubber, and other materials which modify the properties of the product.

In preparing molding compounds by mixtures of the fillers with the binders or resins of the present invention, equal parts, for example, of filler and binder may be combined to produce the molding powder. The filler may be simply ground with the binder, or may be impregnated by means of a solution. Or the materials may be incorporated and worked out into sheeted form. This may be accomplished by mixing or differential rolls, and then running through sheeting rolls. Mica in powdered form, or the other filling materials, such as the powdered or fibrous fillers, may be employed to yield plastic compositions which may be shaped by hot pressing to make molded articles. The resins of the present invention have the property of hardening or setting when heated and this reaction may be utilized to bring about a curing of the product in a hot press or in a baking oven, or under exposure to heat in other ways.

Paper or cloth may be impregnated and sheets pressed together to form blocks. Or the binding agent in the form of a solution may be used as a lacquer, or incorporated with filler may be employed as a cement. As an example of the method of using a solution or syrup of the condensation products, the following is given. Thin splittings of mica of about 1 inch in diameter were coated on one side with the solution, such as that obtained by the production of the urea-formaldehyde resin in the presence of phthalic acid as explained above. The coated splittings of mica were laid on a wire screen in such a manner that the edges overlapped to form a sheet. The sheet was dried for about 10 minutes at 80° C. and then coated on the other side and similarly dried. Two sheets were placed together, and on either side was placed an additional sheet which was coated on one side only, that side being the one in contact with the two inner sheets. The four sheets were amalgamated into a composite sheet in a hydraulic press under a pressure of 2000 pounds for 10 minutes at 120° C. A firm stiff well-bonded composite sheet made up of the cemented mica splittings was thus obtained. The sheet was light colored and translucent.

Accordingly a number of fabricated products may be produced in accordance with the present invention, among these being applications in the varnish, lacquer, paint and enamel industry, as an impregnating material for hat stiffening and as a cement. It may be used in substitution for glass for various purposes such as lenses, windshields, revolving doors, etc., in making imitation gems, beads, cigarette and cigar holders, pipe stems, umbrella and cane handles, fountain pens, billiard balls, ash trays, phonograph records, camera parts, grinding wheels, gears, artificial amber, insulation, white or light colored articles, buttons, ink stands, ornamental articles, dishes, etc. It may be reenforced by the use of appropriate wire netting or by adhesive paper or cloth. Or articles may be built up of impregnated sheets or fibrous material pressed together in a hot press.

What I claim is:—

1. A resinous substance comprising reaction product of formaldehyde and urea with a resin containing sulphur bound in the resin molecule.

2. A resinous substance comprising a reaction product of a resin containing sulphur bound in the resin-molecule and an aldehyde condensed with a urea derivative selected from the group consisting of urea, and its substituted compounds capable of yielding an amorphous condensation product with the aldehyde.

3. A resinous substance comprising a catalyzed, reaction product of urea and thiourea with a reactive aldehyde.

4. A condensation product comprising reaction product of an aldehyde-urea condensation product and a resin containing sulphur bound in the resin molecule including a proteid in the condensation product.

5. A resinous composite comprising aldehyde reaction products of urea and an organic sulphur-containing resinous product.

6. A resinous composite comprising the solid reaction products of urea and formaldehyde associated with an organic sulphur-containing plastic body.

7. The process for the manufacture of an improved solution for use in preparing moulding products from synthetic resin which consists in causing the inter-mixing in solution of a condensation product of thiourea and formaldehyde with a condensation product of urea and formaldehyde, the condensation products being of substantially the same degree of condensation.

8. The process for the manufacture of an improved solution for use in preparing moulding products from synthetic resin, which consists in causing the intermixing in the solution of a condensation product of thiourea and formaldehyde with a condensation product of urea and formaldehyde, the condensation products being of substantially the same degree of condensation, and concentrating the solution by evaporation.

9. The process for the manufacture of an improved solution for use in preparing moulding products from synthetic resin which consists in simultaneously dissolving urea and thiourea in formaldehyde.

10. A solution for use in preparing moulding products from synthetic resin, the solution containing in a dissolved state a condensation product of thiourea and formaldehyde and a condensation product of urea and formaldehyde, the condensation products being of substantially the same degree of condensation.

11. A solution for use in preparing moulding products from synthetic resin, the solution containing water and dissolved therein a condensation product of thiourea and formaldehyde and a condensation product of urea and formaldehyde, the condensation products being of substantially the same degree of condensation.

12. A resinous complex containing the condensation products of formaldehyde with urea and a formaldehyde with thiourea, the condensation products being of substantially the same degree of condensation.

13. The method of making a resinous complex which comprises interacting formaldehyde with urea and formaldehyde with thiourea to produce a condensation product of each of the ingredients specified, the condensation products being of substantially the same degree of condensation.

14. The synthetic resin produced by causing the intermixing in solution of a condensation product of thiourea and formaldehyde with a condensation product of urea and formaldehyde, the mixed condensation products being of substantially the same degree of condensation, by concentrating the solution by evaporation, and finally by drying the solution.

15. The process for the manufacture of an improved solution for use in preparing molding products from synthetic resin which consists in dissolving urea and thiourea in formaldehyde without heating the solution to the boiling point for any substantial period of time.

16. A resinous complex containing the resinous formaldehyde, simultaneous reaction products of urea and thiourea.

17. The method of making a resinous complex which comprises simultaneously interacting formaldehyde with urea and thiourea.

CARLETON ELLIS.